L. M. ANDERSON.
METHOD OF PRODUCING MOTION PICTURES.
APPLICATION FILED MAY 26, 1916.

1,250,412.

Patented Dec. 18, 1917.

Inventor.
Lewis M. Anderson.

UNITED STATES PATENT OFFICE.

LEWIS M. ANDERSON, OF ATLANTA, GEORGIA.

METHOD OF PRODUCING MOTION-PICTURES.

1,250,412. Specification of Letters Patent. Patented Dec. 18, 1917.

Application filed May 26, 1916. Serial No. 101,402.

*To all whom it may concern:*

Be it known that I, LEWIS M. ANDERSON, a citizen of the United States, residing at Atlanta, in the county of Fulton and State of Georgia, have invented new and useful Improvements in the Methods of Producing Motion-Pictures, of which the following is a specification.

This invention relates to the method of producing motion pictures of drawings, sketches, cartoons, pictures, writing, printing, or other matter while such are being executed, and has for its object to render the process more expeditious, cheaper, and to produce a more satisfactory result.

I attain this object by the method illustrated in the accompanying drawings, in which—

Figure 1:
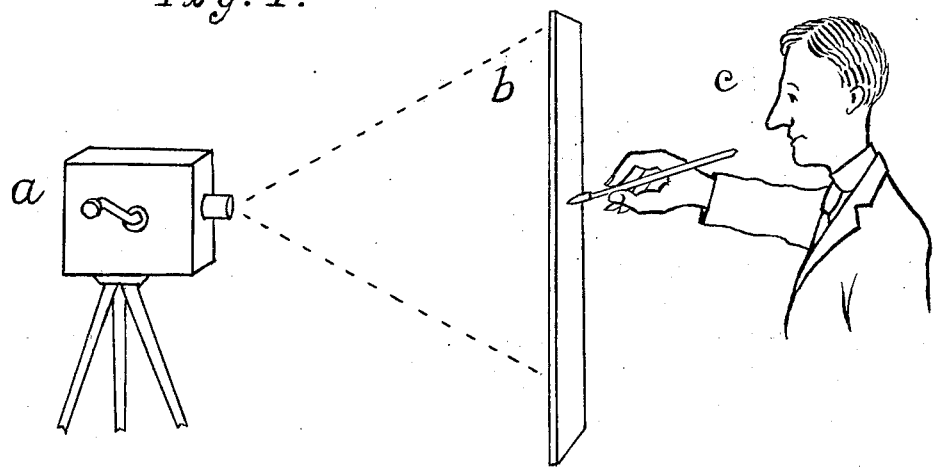
Figure 2:
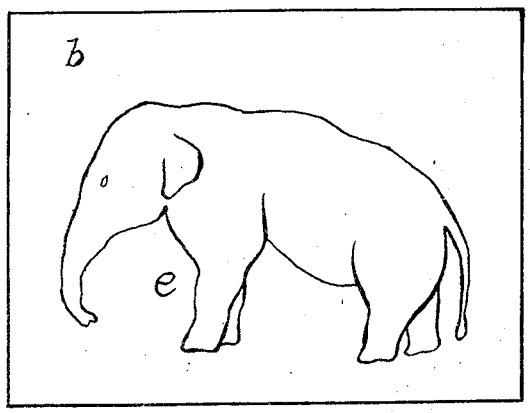

Figure 1, is a general view showing the method of operation; Fig. 2, is a front view of the screen with a drawing showing through it. In Fig. 1, (A) represents the motion picture camera; (B) the screen, and (C) the draftsman executing a drawing on the screen. In Fig. 2, (B) represents the screen, and (E) a drawing executed on the screen and visible through it.

Instead of photographing in the usual direct manner with a motion picture camera, drawings, pictures, writing, or other matter, while being executed by the draftsman or artist, which necessarily shows in the resulting motion picture the brush or pencil, and at least the hand of the draftsman, I use a method by which the draftsman or artist is rendered photographically invisible, and the drawing, picture, or other matter appears in the resulting motion picture when projected on the exhibition screen without the means of its production visible. I accomplish this result by interposing between the motion picture camera and the artist or draftsman a screen on which he executes the drawings or pictures, such screen being translucent, or substantially photographically opaque except to the drawings or pictures executed on its surface, and being adapted to render the draftsman or artist photographically invisible, and to render the drawings or pictures photographically visible through the screen as executed; the drawings or pictures being photographed by the motion picture camera as they become visible through the screen.

The screen used to accomplish this result may be of translucent ground glass of the proper degree of opacity to render objects or matter not in immediate proximity or contact with it photographically invisible through it; or a screen may be prepared by backing clear glass with white tissue paper, or by coating clear glass with a suitable medium for making it translucent, or substantially photographically opaque except to the drawings, pictures, or other matter executed on its surface. Various mediums may be used for this purpose, but I prefer to use a screen prepared by coating a sheet of clear glass with a mixture of flour and water, in about equal parts, and allowing it to dry in a horizontal position to insure an even coat. This gives a screen whiter than ground glass, and substantially photographically opaque except to the drawings, pictures, or other matter executed on its surface, and renders the draftsman or artist substantially or wholly photographically invisible. It affords an excellent working surface for oil or water colors, or oil crayons, and the flour paste coating being very soluble, oil or water colors penetrate it immediately, the drawings or pictures as executed becoming clearly visible through the screen on a white background, and giving a superior result in the motion picture negative.

Referring to Fig. 1 in the annexed drawing, my method of procedure in producing a motion picture by this process is for the draftsman or artist, represented by (C), to execute a drawing or picture on the screen (B), which drawing or picture is immediately visible through the screen and is photographed by the motion picture camera (A) as executed; while the draftsman or artist (C), not being in direct contact with the screen (B), is photographically invisible, and does not appear in the resulting motion picture.

As the drawing, picture, writing, or other matter is photographed by this method as it becomes visible through the screen on which it is executed, it appears reversed from left to right in the resulting motion picture, but this is corrected by reversing the positive film when run in the projecting camera. If it is desired to have the drawings, pictures, or other matter appear on the exhibition screen in white on a dark ground, this can be accomplished by running a negative film in the projecting camera.

In producing motion picture negatives by this method it is desirable to exclude strong light from the draftsman except such as is transmitted through the translucent screen, in order to prevent any trace of the hand or pen from appearing in the picture. An effective and convenient arrangement for this purpose is to set up the translucent screen, like a window, in an opening in the partition between two rooms, the camera and electric light being placed in one room, and the draftsman in the other room, from which room the light is excluded to the extent desired, except such as is transmitted through the screen.

I claim:

The method of producing motion pictures in which drawings, cartoons, writing, or other matter are executed on a translucent screen, or on a screen substantially photographically opaque except to the drawings or other matter executed on its surface, said screen during the process of executing the drawings or other matter being interposed between the artist or draftsman and a motion picture camera; such screen rendering the artist or draftsman substantially or wholly photographically invisible, and rendering the drawings or other matter executed on its surface visible through the screen as produced; and the photographing with the motion picture camera of such drawings or other matter as they become visible through the screen as executed.

LEWIS M. ANDERSON